United States Patent [19]
Fujita et al.

[11] Patent Number: 4,688,903
[45] Date of Patent: Aug. 25, 1987

[54] WIDE ANGLE LENS

[75] Inventors: Hisao Fujita, Hino; Hiroyuki Yamazaki; Tomoko Wakabayashi, both of Tokyo, all of Japan

[73] Assignee: Konishiroku Photo Industry Co., Ltd., Tokyo, Japan

[21] Appl. No.: 746,623

[22] Filed: Jun. 19, 1985

[30] Foreign Application Priority Data

Jun. 20, 1984 [JP] Japan .................... 59-125374

[51] Int. Cl.$^4$ .................... G02B 9/34; G02B 13/18
[52] U.S. Cl. .................... 350/432
[58] Field of Search .................... 350/432, 469

[56] References Cited
FOREIGN PATENT DOCUMENTS 0078815 6/1981 Japan .................... 350/469

Primary Examiner—John K. Corbin
Assistant Examiner—Rebecca D. Gass
Attorney, Agent, or Firm—Jordan B. Bierman

[57] ABSTRACT

This invention relates to a wide angle lens for a compact camera using a lens shutter, in which wide angle lens, a distance from a front surface of the lens to a film surface is short. The lens is a lens of the inverted retrofocus type in which a negative meniscus lens greatly curved toward an image is arranged at the rear of a triplet lens of convex, concave and convex. The second, third and fourth lenses each comprise a plastic lens. Various aberrations are compensated and variation in focal length due to a variation in temperature is also prevented. By the formation of plastic lenses, it is possible to easily form the fourth lens into an aspherical lens.

6 Claims, 38 Drawing Figures

F 3.5

-1.0 0 1.0
SPHERICAL
ABERRATION

W = 31.7°

-1.0 0 1.0
ASTIGMATISM

-2.0 0 2.0
DISTORTION

WIDE ANGLE LENS

BACKGROUND OF THE INVENTION

1. Field of the Invention

This invention relates to a photographic lens, and more particularly to a lens shutter photographic lens having a half-angle of view of about 32° and F4.0 as well as being compact.

2. Description of the Prior Art

With the trend of compactness of a camera using a lens shutter, a demand of formation of a photographic lens into compactness is also increased. To this end, various proposals have been made for lenses of the inverted retrofocus type in which a negative meniscus lens having a great curvature toward an image is arranged at the rear of a triplet of convex, concave and convex.

In well known photographic lenses of the type as described above, the lens disclosed, for example, in Japanese Patent Laid-Open Application No. 73014/80 has four lenses which are all formed of glass material and which has a refractive index larger than 1.6. In Japanese Patent Publication Nos. 75612/81 and 94317/81, a negative second lens has a refractive index above 1.7. As described above, in these lenses, particularly the second lens has a high refractive index, $N > 1.65$, and it has been difficult to form this lens into a resin lens. Further, in Japanese Patent Laid-Open No. 99313/81, it is found that a refractive index of material for the second, third and fourth lenses is $N < 1.65$, and a telephoto ratio is about 1.10, which is insufficient in terms of compactness of the entire lens system.

SUMMARY OF THE INVENTION

The present invention is intended to provide an inexpensive photographic lens in which a refractive index of a second lens is less than 1.65, a second and a third and a fourth lenses comprise resin lenses of telephoto ratio of about 1.05 and angle of view of 31° and F3.5.

The above-described problem is solved by the present invention by the construction of a lens which comprises, from an object side, a first positive meniscus lens with a convex surface directed toward an object, a second dual concave lens, a third dual convex lens and a fourth negative meniscus lens with a concave surface greatly directed toward an object, the second, third and forth lenses being made of resin, and the lens being satisfied with the following conditions:

$$1.1 < f/f_1 < 2.0 \quad (1)$$

$$N_2 < 1.65 \quad (2)$$

Secondly, for formation of the third and fourth lenses into resin lenses, the lens is satisfied with the following conditions:

$$\left.\begin{array}{l} N_3 < 1.65 \\ N_4 < 1.65 \end{array}\right\} \quad (3)$$

Desirably, the lens is satisfied with the following conditions:

$$0 < f/|f_4| < 1.0, \; f_4 < 0 \quad (4)$$

$$0.50 < f_{123}/f < 1.0 \quad (5)$$

$$-1.0 \times 10^{-2} < \Delta_7(0.13f)/f < -1.0 \times 10^{-5} \quad (6)$$

$$1.0 \times 10^{-5} < \Delta_8(0.14f)/f < 5.0 \times 10^{-2} \quad (7)$$

$$0.02f < d_5 < 0.25f \quad (8)$$

where

- $f$: combined focal length of the entire lens system
- $f_i$: focal length of the i lens
- $N_i$: refractive index of the i lens
- $f_{123}$: combined focal length from the 1st lens to 3rd lens
- $d_i$: spacing of the $i^{th}$ refractive surface
- $\Delta_i(\phi)$: amount of an aspherical surface of the $i^{th}$ refractive surface If the aspherical shape is represented by $$Z(\phi) = \frac{C\phi^2}{1 + \sqrt{1 - (1+k)C^2\phi^2}} + \sum_j A_{pj}\phi^{Pj}$$

an amount of displacement from a spherical surface having a paraxial curvature at a position of $\phi$ from an optical axis is given by:

$$\Delta(\phi) = \frac{C\phi^2}{1 + \sqrt{1 - (1+k)C^2\phi^2}} + \sum_j A_{pj}\phi^{Pj} - \frac{C^*\phi^2}{1 + \sqrt{1 - C^{*2}\phi^2}}$$

$$C^* = C + 2A_2$$

Where a multiplicity of resin lenses are used, it becomes necessary to minimize the variation of backfocus due to the variation of refractive index resulting from temperatures. For this purpose, the condition (1) is provided, and the fact that the value exceeds the upper limit to increase a power of the first lens is to increase a negative combined power of the fourth resin lens system, which is liable to be affected by variation of temperatrure. Conversely, when the value exceeds the lower limit, it is hard to be affected by the variation of temperature but the overall length of lens increases and spherical aberration becomes short in compensation.

The conditions (2) and (3) are concerned with a restriction caused by resin material capable of being utilized to form the third and fourth lenses into resin lenses.

In the past, in the lenses of this kind, it is general that the Abbe number $\nu_2$ of the second lens is less than 30, but in the resin lenses, the Abbe number was, say, 35. Because of this, where the second lens is formed into a resin lens, it is desirable that a negative power of the second lens is powerful for compensation of chromatic aberration. On the other hand, however, it is desirable that to adequately maintain the Petzval's sum, a negative power is weak to compensate that the refractive index is low. By this balance, an adequate refracting power of the second lens is determined. Thereby, a portion at which the Petzval's sum is excessively small can be compensated by reducing a negative power of the fourth lens. The condition (4) is concerned with this and the upper limit is a condition required for compensation of Petzval's sum. A negative power of the fourth lens functions to move a principal point on the image side to the object side to form the lens system into a tele-type to shorten the overall length. The lower limit is a limit for not losing said function.

The under correction of chromatic aberration can be compensated by not exceeding the upper limit of the condition (1) and by being satisfied with the condition (5). The lower limit is a limit which weakens a positive power of the third lens to produce no under correction of chromatic aberration caused by the second lens. When the value exceeds the upper limit, the overall length of the lens increases.

Surfaces can be formed into aspherical surfaces to thereby improve compensation of aberrations. As an example in which an aspherical surface is introduced into the fourth lens, there is proposed Japanese Patent Laid-Open Application No. 57106/83 filed by the present applicant, in which application, the direction of displacement from a paraxial curvature spherical surface of an aspherical surface is reversed to that of the present invention. This is because of the fact that a curve of an image surface is displaced in a direction of preventing a short of compensation thereof since the refracting power of the fourth lens has been weakened as in the condition (4).

With respect to the concave surface of the fourth lens on the object side, an amount of displacement from the aforesaid spherical surface increases toward the object as it moves from the optical axis toward the outer diameter. The upper limit of the condition (6) is a limit at which the effect of formation into an aspherical surface is obtained, and when the value exceeds the lower limit, it becomes difficult to prevent foramtion of an outwardly directed coma.

With respect to the convex surface on the image side of the fourth lens, an amount of displacement increases toward the image as it moves from the optical axis in a direction of the outer diameter. The lower limit of the condition (7) is a limit at which the effect of formation into an aspherical surface is obtained, and when the value exceeds the upper limit, an inwardly directed coma formed in said surface becomes small, resulting in a difficulty of compensation of the coma as the entire lens system.

The condition (8) is concerned with the compensation of a curve of an image surface, and when the value exceeds the lower limit, the effect of compensation is insufficient, and a thickness of an edge of the third lens cannot be secured thus bringing forth a problem in terms of processing. Conversely, when the value exceeds the upper limit, the overall length of a lens increases, thus resulting in a difficulty in securing a ratio of brightness of the edge of the image field.

DETAILED DESCRIPTION OF THE PREFERRED EMBODIMENTS

Figure 1A:
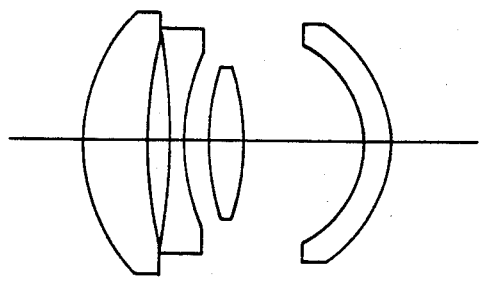
In FIGS. 1 to 19, (a) are sectional views showing the construction of lenses in Examples 1 to 19, respectively, and (b) are views of aberrations thereof.

Embodiments which are satisfied with the above-described conditions are shown hereinafter. In the following tables, reference character f designates the focal length; F, F number; W, half-angle of view; R, radius of curvature; D, distance between refractive surfaces; N, refractive index; and $\nu$, Abbe number.

Embodiment 1

| | R | D | N | $\nu$ |
|---|---|---|---|---|
| | $f = 100$ | $W = 31.9°$ | $F\ 3.5$ | |
| 1 | 28.353 | 10.85 | 1.69680 | 55.5 |
| 2 | 65.613 | 3.53 | | |
| 3 | −91.032 | 2.35 | 1.56700 | 34.0 |
| 4 | 32.287 | 3.87 | | |
| 5 | 42.938 | 5.00 | 1.49200 | 55.0 |
| 6 | −52.423 | 20.75 | | |
| 7 | −17.023 | 4.54 | 1.56700 | 34.0 |
| 8 | −20.887 | | | |

Aspherical surface: first surface $K = -1.09817D-01$
$A_1 = -6.98355D-04$   $P_1 = 2.0000$
$A_2 = 3.22197D-07$   $P_2 = 4.0000$
$A_3 = -2.78138D-09$   $P_3 = 6.0000$
$A_4 = 1.06665D-11$   $P_4 = 8.0000$
$A_5 = -1.65029D-14$   $P_5 = 10.0000$ Eighth surface $K = -9.06393D-01$
$A_1 = -7.68498D-04$   $P_1 = 2.0000$
$A_2 = -9.01109D-06$   $P_2 = 4.0000$
$A_3 = -5.04363D-08$   $P_3 = 6.0000$
$A_4 = 1.26546D-10$   $P_4 = 8.0000$
$A_5 = -3.17038D-13$   $P_5 = 10.0000$ $f_1 = 68.56$   $f_{123} = 80.88$   $f_4 = -386.41$
$\Delta X_1(0.13f) = 2.3470 \times 10^{-3}$
$\Delta X_8(0.14f) = 1.0017 \times 10^{-1}$ Embodiment 2

| | R | D | N | $\nu$ |
|---|---|---|---|---|
| | $f = 100$ | $W = 31.9°$ | $F\ 3.5$ | |
| 1 | 29.528 | 10.90 | 1.69680 | 55.5 |
| 2 | 65.794 | 3.53 | | |
| 3 | −89.479 | 2.35 | 1.56700 | 34.0 |
| 4 | 32.412 | 3.85 | | |
| 5 | 43.413 | 5.00 | 1.49200 | 55.0 |
| 6 | −51.854 | 20.85 | | |
| 7 | −17.040 | 4.62 | 1.56700 | 34.0 |
| 8 | −21.063 | | | |

Aspherical surface: second surface $K = 6.42845D-03$
$A_1 = -5.21896D-05$   $P_1 = 2.0000$
$A_2 = -1.81529D-07$   $P_2 = 4.0000$
$A_3 = 5.42163D-10$   $P_3 = 6.0000$
$A_4 = 2.68108D-12$   $P_4 = 8.0000$
$A_5 = 3.32138D-15$   $P_5 = 10.0000$ Eighth surface $K = -1.02719D+00$
$A_1 = -8.70551D-04$   $P_1 = 2.0000$
$A_2 = -1.10836D-05$   $P_2 = 4.0000$
$A_3 = -4.78884D-08$   $P_3 = 6.0000$
$A_4 = 1.23991D-10$   $P_4 = 8.0000$
$A_5 = -3.18671D-13$   $P_5 = 10.0000$ $f_1 = 68.15$   $f_{123} = 80.68$   $f_4 = -380.13$
$\Delta X_2(0.13f) = 4.2610 \times 10^{-4}$
$\Delta X_8(0.14f) = 8.8227 \times 10^{-2}$ Embodiment 3

| | R | D | N | $\nu$ |
|---|---|---|---|---|
| | $f = 100$ | $W = 31.9°$ | $F\ 3.5$ | |
| 1 | 29.780 | 10.83 | 1.69680 | 55.5 |
| 2 | 67.027 | 3.53 | | |
| 3 | −96.148 | 2.35 | 1.56700 | 34.0 |
| 4 | 32.762 | 3.77 | | |
| 5 | 43.285 | 5.00 | 1.49200 | 55.0 |
| 6 | −49.958 | 20.89 | | |
| 7 | −17.019 | 4.65 | 1.56700 | 34.0 |
| 8 | −20.832 | | | |

Aspherical surface: third surface $K = -2.74474D-03$
$A_1 = -8.05133D-04$   $P_1 = 2.0000$
$A_2 = 4.70071D-07$   $P_2 = 4.0000$
$A_3 = -3.57658D-09$   $P_3 = 6.0000$
$A_4 = 3.34276D-12$   $P_4 = 8.0000$
$A_5 = 3.34172D-15$   $P_5 = 10.0000$ Eighth surface $K = -1.28494D+00$
$A_1 = -6.68517D-04$   $P_1 = 2.0000$
$A_2 = -1.48994D-05$   $P_2 = 4.0000$ -continued

| | | | |
|---|---|---|---|
| A3 = | −4.54178D−08 | P3 = | 6.0000 |
| A4 = | 1.21043D−10 | P4 = | 8.0000 |
| A5 = | −3.20395D−13 | P5 = | 10.0000 |

$f_1 = 68.70 \quad f_{123} = 80.72 \quad f_4 = -388.66$
$\Delta X_3(0.10f) = 2.2634 \times 10^{-3}$
$\Delta X_8(0.14f) = 9.0951 \times 10^{-2}$

Embodiment 4
$f = 100 \quad W = 32.0° \quad F\ 3.5$

| | R | D | N | ν |
|---|---|---|---|---|
| 1 | 30.374 | 10.97 | 1.69680 | 55.5 |
| 2 | 67.582 | 3.53 | | |
| 3 | −81.070 | 2.35 | 1.56700 | 34.0 |
| 4 | 32.177 | 3.98 | | |
| 5 | 44.458 | 5.00 | 1.49200 | 55.0 |
| 6 | −50.704 | 20.94 | | |
| 7 | −16.891 | 4.54 | 1.56700 | 34.0 |
| 8 | −20.889 | | | |

Aspherical surface: fourth surface

| | | | |
|---|---|---|---|
| K = | 5.36539D−02 | | |
| A1 = | −1.66039D−03 | P1 = | 2.0000 |
| A2 = | −2.04191D−06 | P2 = | 4.0000 |
| A3 = | 5.19197D−09 | P3 = | 6.0000 |
| A4 = | 3.45845D−12 | P4 = | 8.0000 |
| A5 = | 1.27238D−15 | P5 = | 10.0000 |

Aspherical surface: fifth surface

| | | | |
|---|---|---|---|
| K = | −1.42513D+00 | | |
| A1 = | −4.85760D−04 | P1 = | 2.0000 |
| A2 = | −1.65866D−05 | P2 = | 4.0000 |
| A3 = | −4.38133D−08 | P3 = | 6.0000 |
| A4 = | 1.21816D−10 | P4 = | 8.0000 |
| A5 = | −3.19531D−13 | P5 = | 10.0000 |

$f_1 = 70.62 \quad f_{123} = 78.88 \quad f_4 = -314.49$
$\Delta X_4(0.10f) = -9.9979 \times 10^{-4}$
$\Delta X_8(0.14f) = 7.3196 \times 10^{-2}$

Embodiment 5
$f = 100 \quad W = 32.0° \quad F\ 3.5$

| | R | D | N | ν |
|---|---|---|---|---|
| 1 | 30.271 | 10.99 | 1.69680 | 55.5 |
| 2 | 77.296 | 3.53 | | |
| 3 | −88.198 | 2.35 | 1.56700 | 34.0 |
| 4 | 36.334 | 4.17 | | |
| 5 | 41.421 | 5.00 | 1.49200 | 55.0 |
| 6 | −51.074 | 20.89 | | |
| 7 | −17.392 | 4.37 | 1.56700 | 34.0 |
| 8 | −21.911 | | | |

Aspherical surface: fifth surface

| | | | |
|---|---|---|---|
| K = | −2.58090D−03 | | |
| A1 = | −2.98396D−03 | P1 = | 2.0000 |
| A2 = | −2.26305D−07 | P2 = | 4.0000 |
| A3 = | −1.00027D−08 | P3 = | 6.0000 |
| A4 = | −3.44408D−12 | P4 = | 8.0000 |
| A5 = | −8.20640D−16 | P5 = | 10.0000 |

Eighth surface

| | | | |
|---|---|---|---|
| K = | −1.51335D+00 | | |
| A1 = | −1.01582D−03 | P1 = | 2.0000 |
| A2 = | −1.68423D−05 | P2 = | 4.0000 |
| A3 = | −3.98236D−08 | P3 = | 6.0000 |
| A4 = | 1.20683D−10 | P4 = | 8.0000 |
| A5 = | −3.21455D−13 | P5 = | 10.0000 |

$f_1 = 65.15 \quad f_{123} = 79.78 \quad f_4 = -321.37$
$\Delta X_5(0.10f) = -2.1760 \times 10^{-3}$
$\Delta X_8(0.14f) = 3.4389 \times 10^{-2}$

Embodiment 6
$f = 100 \quad W = 32.2° \quad F\ 3.5$

| | R | D | N | ν |
|---|---|---|---|---|
| 1 | 30.603 | 11.18 | 1.69680 | 55.5 |
| 2 | 77.480 | 3.53 | | |
| 3 | −87.752 | 2.35 | 1.56700 | 34.0 |
| 4 | 35.080 | 4.44 | | |
| 5 | 54.000 | 5.00 | 1.49200 | 55.0 |
| 6 | −53.992 | 21.03 | | |
| 7 | −17.692 | 4.16 | 1.56700 | 34.0 |
| 8 | −21.915 | | | |

Aspherical surface: sixth surface

| | | | |
|---|---|---|---|
| K = | −2.91373D−02 | | |
| A1 = | −6.79925D−04 | P1 = | 2.0000 |
| A2 = | −7.52229D−07 | P2 = | 4.0000 |
| A3 = | 7.76804D−09 | P3 = | 6.0000 |
| A4 = | 1.64481D−12 | P4 = | 8.0000 |
| A5 = | 2.46907D−16 | P5 = | 10.0000 |

Eighth surface

| | | | |
|---|---|---|---|
| K = | −1.64866D+00 | | |
| A1 = | −1.20107D−03 | P1 = | 2.0000 |
| A2 = | −1.86948D−05 | P2 = | 4.0000 |
| A3 = | −3.83143D−08 | P3 = | 6.0000 |
| A4 = | 1.19547D−10 | P4 = | 8.0000 |
| A5 = | −3.21855D−13 | P5 = | 10.0000 |

$f_1 = 66.12 \quad f_{123} = 82.08 \quad f_4 = -401.01$
$\Delta X_6(0.10f) = 2.5929 \times 10^{-3}$
$\Delta X_8(0.14f) = 4.1953 \times 10^{-2}$

Embodiment 7
$f = 100 \quad W = 32.2° \quad F\ 3.5$

| | R | D | N | ν |
|---|---|---|---|---|
| 1 | 29.265 | 10.43 | 1.69680 | 55.5 |
| 2 | 71.211 | 3.53 | | |
| 3 | −87.358 | 2.35 | 1.56700 | 34.0 |
| 4 | 33.539 | 3.88 | | |
| 5 | 52.790 | 5.00 | 1.49200 | 55.0 |
| 6 | −48.973 | 20.92 | | |
| 7 | −17.672 | 4.40 | 1.56700 | 34.0 |
| 8 | −19.177 | | | |

Aspherical surface: third surface

| | | | |
|---|---|---|---|
| K = | −1.43589D−02 | | |
| A1 = | 1.00249D−04 | P1 = | 2.0000 |
| A2 = | 1.10020D−07 | P2 = | 4.0000 |
| A3 = | −3.01890D−09 | P3 = | 6.0000 |
| A4 = | 3.22609D−12 | P4 = | 8.0000 |
| A5 = | 4.89572D−15 | P5 = | 10.0000 | seventh surface

| | | | |
|---|---|---|---|
| K = | 2.19044D−01 | | |
| A1 = | −2.59346D−03 | P1 = | 2.0000 |
| A2 = | −3.07255D−06 | P2 = | 4.0000 |
| A3 = | −3.33749D−09 | P3 = | 6.0000 |
| A4 = | −2.08622D−12 | P4 = | 8.0000 |
| A5 = | 3.58909D−16 | P5 = | 10.0000 |

$f_1 = 64.69 \quad f_{123} = 80.94 \quad f_4 = -392.28$
$\Delta X_3(0.10f) = -1.6177 \times 10^{-3}$
$\Delta X_7(0.13f) = -4.1975 \times 10^{-2}$

Embodiment 8
$f = 100 \quad W = 32.1° \quad F\ 3.5$

| | R | D | N | ν |
|---|---|---|---|---|
| 1 | 28.418 | 9.69 | 1.69680 | 55.5 |
| 2 | 71.055 | 3.53 | | |
| 3 | −78.710 | 2.35 | 1.56700 | 34.0 |
| 4 | 32.654 | 3.69 | | |
| 5 | 52.470 | 5.19 | 1.49200 | 55.0 |
| 6 | −50.292 | 21.15 | | |
| 7 | −16.243 | 4.73 | 1.56700 | 34.0 |
| 8 | −21.620 | | | |

Aspherical surface: third surface

| | | | |
|---|---|---|---|
| K = | −1.83397D−02 | | |
| A1 = | 1.02289D−03 | P1 = | 2.0000 |
| A2 = | −1.86804D−07 | P2 = | 4.0000 |
| A3 = | −4.92996D−10 | P3 = | 6.0000 |
| A4 = | −1.61809D−13 | P4 = | 8.0000 |
| A5 = | 1.48833D−15 | P5 = | 10.0000 |

Eighth surface

| | | | |
|---|---|---|---|
| K = | 2.13223D−01 | | |
| A1 = | −2.31016D−03 | P1 = | 2.0000 |
| A2 = | −1.22335D−06 | P2 = | 4.0000 |
| A3 = | 3.16433D−10 | P3 = | 6.0000 |
| A4 = | −8.85154D−12 | P4 = | 8.0000 |
| A5 = | −1.48722D−14 | P5 = | 10.0000 |

$f_1 = 62.17 \quad f_{123} = 79.10 \quad f_4 = -331.24$
$\Delta X_3(0.10f) = -3.3764 \times 10^{-3}$
$\Delta X_8(0.14f) = 1.4076 \times 10^{-2}$

Embodiment 9
$f = 100 \quad W = 32.1° \quad F\ 3.5$

| | R | D | N | ν |
|---|---|---|---|---|
| 1 | 33.950 | 12.42 | 1.69680 | 55.5 |
| 2 | 65.617 | 3.38 | | |
| 3 | −87.414 | 2.35 | 1.56700 | 34.0 |
| 4 | 25.127 | 5.70 | | |
| 5 | 32.538 | 5.64 | 1.49200 | 55.0 |

-continued

| | | | | |
|---|---|---|---|---|
| 6 | −55.053 | 26.96 | | |
| 7 | −16.916 | 3.30 | 1.56700 | 34.0 |
| 8 | −24.191 | | | |

Aspherical surface: fourth surface $K = -3.22417D-01$
$A1 = -4.73875D-03 \quad P1 = 2.0000$
$A2 = -3.16169D-07 \quad P2 = 4.0000$
$A3 = 8.17882D-10 \quad P3 = 6.0000$
$A4 = 1.98606D-11 \quad P4 = 8.0000$
$A5 = 8.95203D-15 \quad P5 = 10.0000$ Eighth surface $K = -2.27770D+00$
$A1 = -3.77194D-03 \quad P1 = 2.0000$
$A2 = -2.16890D-05 \quad P2 = 4.0000$
$A3 = -3.86175D-08 \quad P3 = 6.0000$
$A4 = 1.20709D-10 \quad P4 = 8.0000$
$A5 = -3.09245D-13 \quad P5 = 10.0000$ $f_1 = 86.96 \quad f_{123} = 79.36 \quad f_4 = -259.96$
$\Delta X_4(0.10f) = 1.9650 \times 10^{-2}$
$\Delta X_8(0.14f) = 7.4912 \times 10^{-2}$ Embodiment 10
$f = 100 \quad W = 31.9° \quad F \ 3.5$

| | R | D | N | $\nu$ |
|---|---|---|---|---|
| 1 | 29.056 | 10.59 | 1.69680 | 55.5 |
| 2 | 64.537 | 3.53 | | |
| 3 | −87.130 | 2.35 | 1.56700 | 34.0 |
| 4 | 32.677 | 3.55 | | |
| 5 | 43.107 | 5.00 | 1.49200 | 55.0 |
| 6 | −50.395 | 21.44 | | |
| 7 | −16.768 | 5.82 | 1.56700 | 34.0 |
| 8 | −20.594 | | | |

Aspherical surface: third surface $K = -1.88715D-02$
$A1 = -7.59623D-07 \quad P1 = 4.0000$
$A2 = 7.00775D-08 \quad P2 = 5.0000$
$A3 = -2.91667D-09 \quad P3 = 6.0000$
$A4 = -7.56367D-11 \quad P4 = 7.0000$
$A5 = 2.63583D-13 \quad P5 = 8.0000$
$A6 = 1.00060D-13 \quad P6 = 9.0000$
$A7 = 4.13704D-15 \quad P7 = 10.0000$ Eighth surface $K = -1.88774D-01$
$A1 = -3.13186D-06 \quad P1 = 4.0000$
$A2 = 7.53868D-07 \quad P2 = 5.0000$
$A3 = -7.92214D-08 \quad P3 = 6.0000$
$A4 = 7.05623D-10 \quad P4 = 7.0000$
$A5 = 1.23128D-10 \quad P5 = 8.0000$
$A6 = 1.95651D-12 \quad P6 = 9.0000$
$A7 = -3.15609D-13 \quad P7 = 10.0000$ $f_1 = 67.57 \quad f_{123} = 78.52 \quad f_4 = -353.98$
$\Delta X_3(0.10f) = -4.0576 \times 10^{-3}$
$\Delta X_8(0.14f) = 6.9401 \times 10^{-2}$ Embodiment 11
$f = 100 \quad W = 31.8° \quad F \ 3.5$

| | R | D | N | $\nu$ |
|---|---|---|---|---|
| 1 | 27.198 | 12.85 | 1.69680 | 55.5 |
| 2 | 51.861 | 3.53 | | |
| 3 | −165.831 | 2.35 | 1.56700 | 34.0 |
| 4 | 23.655 | 2.43 | | |
| 5 | 34.088 | 8.11 | 1.49200 | 55.0 |
| 6 | −59.494 | 22.72 | | |
| 7 | −15.950 | 4.71 | 1.56700 | 34.0 |
| 8 | −17.940 | | | |

Aspherical surface: third surface $K = -1.38788D-01$
$A1 = -3.72747D-06 \quad P1 = 4.0000$
$A2 = 2.20510D-07 \quad P2 = 5.0000$
$A3 = -1.53567D-09 \quad P3 = 6.0000$
$A4 = -1.14152D-10 \quad P4 = 7.0000$
$A5 = -1.92405D-12 \quad P5 = 8.0000$
$A6 = 2.93642D-14 \quad P6 = 9.0000$
$A7 = 2.27602D-15 \quad P7 = 10.0000$ Eighth surface $K = -6.69702D-02$
$A1 = -1.80453D-06 \quad P1 = 4.0000$
$A2 = 7.57435D-07 \quad P2 = 5.0000$
$A3 = -7.69900D-08 \quad P3 = 6.0000$
$A4 = 8.38416D-10 \quad P4 = 7.0000$
$A5 = 1.28009D-10 \quad P5 = 8.0000$
$A6 = 2.11799D-12 \quad P6 = 9.0000$
$A7 = -3.09515D-13 \quad P7 = 10.0000$ $f_1 = 67.57 \quad f_{123} = 88.19 \quad f_4 = -1760.98$
$\Delta X_3(0.10f) = -1.8003 \times 10^{-2}$
$\Delta X_8(0.14f) = 1.1886$ Embodiment 12
$f = 100 \quad W = 31.7° \quad F \ 3.5$

| | R | D | N | $\nu$ |
|---|---|---|---|---|
| 1 | 27.668 | 13.07 | 1.69680 | 55.5 |
| 2 | 54.086 | 3.38 | | |
| 3 | −148.640 | 2.35 | 1.56700 | 34.0 |
| 4 | 24.245 | 2.53 | | |
| 5 | 35.038 | 7.55 | 1.49200 | 55.0 |
| 6 | −58.594 | 22.35 | | |
| 7 | −16.175 | 4.71 | 1.56700 | 34.0 |
| 8 | −18.139 | | | |

Ashperical surface: third surface $K = -1.38651D-01$
$A1 = -3.24558D-06 \quad P1 = 4.0000$
$A2 = 2.01811D-07 \quad P2 = 5.0000$
$A3 = -1.77274D-09 \quad P3 = 6.0000$
$A4 = -1.09006D-10 \quad P4 = 7.0000$
$A5 = -1.57699D-12 \quad P5 = 8.0000$
$A6 = 4.14489D-14 \quad P6 = 9.0000$
$A7 = 2.61224D-15 \quad P7 = 10.0000$ Eighth surface $K = -7.46725D-02$
$A1 = -1.46926D-06 \quad P1 = 4.0000$
$A2 = 7.45140D-07 \quad P2 = 5.0000$
$A3 = -7.76278D-08 \quad P3 = 6.0000$
$A4 = 8.40090D-10 \quad P4 = 7.0000$
$A5 = 1.28953D-10 \quad P5 = 8.0000$
$A6 = 2.15395D-12 \quad P6 = 9.0000$
$A7 = -3.10074D-13 \quad P7 = 10.0000$ $f_1 = 67.57 \quad f_{123} = 88.50 \quad f_4 = -1983.98$
$\Delta X_3(0.10f) = -1.5175 \times 10^{-2}$
$\Delta X_8(0.14f) = 1.2826$ Embodiment 13
$f = 100 \quad W = 31.7° \quad F \ 3.5$

| | R | D | N | $\nu$ |
|---|---|---|---|---|
| 1 | 27.453 | 12.07 | 1.69680 | 55.5 |
| 2 | 59.777 | 3.53 | | |
| 3 | −118.447 | 2.35 | 1.56700 | 34.0 |
| 4 | 24.311 | 1.98 | | |
| 5 | 37.045 | 8.16 | 1.49200 | 55.0 |
| 6 | −53.095 | 19.41 | | |
| 7 | −16.219 | 4.67 | 1.56700 | 34.0 |
| 8 | −20.530 | | | |

Ashperical surface: eighth surface $K = 1.80690D-01$
$A1 = -2.73430D-03 \quad P1 = 2.0000$
$A2 = -2.06083D-06 \quad P2 = 4.0000$
$A3 = 4.79424D-07 \quad P3 = 5.0000$
$A4 = -6.52435D-08 \quad P4 = 6.0000$
$A5 = 1.04243D-09 \quad P5 = 7.0000$
$A6 = 1.17500D-10 \quad P6 = 8.0000$
$A7 = 1.31121D-12 \quad P7 = 9.0000$
$A8 = -3.44244D-13 \quad P8 = 10.0000$ $f_1 = 63.17 \quad f_{123} = 86.32 \quad f_4 = -963.97$
$\Delta X_8(0.14f) = 7.9848 \times 10^{-2}$ Embodiment 14
$f = 100 \quad W = 32.2° \quad F \ 3.5$

| | R | D | N | $\nu$ |
|---|---|---|---|---|
| 1 | 26.480 | 11.41 | 1.69680 | 55.5 |
| 2 | 55.600 | 3.53 | | |
| 3 | −163.102 | 2.35 | 1.56700 | 34.0 |
| 4 | 24.062 | 2.02 | | |
| 5 | 36.914 | 10.93 | 1.49200 | 55.0 |
| 6 | −57.127 | 14.86 | | |
| 7 | −14.463 | 3.68 | 1.56700 | 34.0 |
| 8 | −16.572 | | | |

$f_1 = 62.5$
$F_{123} = 83.72$
$F_4 = -542.44$

Embodiment 15
$f = 100 \quad W = 32.1° \quad F \ 3.5$

-continued

|   | R        | D     | N       | $\nu$ |
|---|----------|-------|---------|------|
| 1 | 26.976   | 12.88 | 1.69680 | 55.5 |
| 2 | 51.727   | 3.53  |         |      |
| 3 | −151.383 | 2.35  | 1.56700 | 34.0 |
| 4 | 23.157   | 1.69  |         |      |
| 5 | 33.068   | 10.93 | 1.49200 | 55.0 |
| 6 | −55.485  | 13.71 |         |      |
| 7 | −13.963  | 2.84  | 1.56700 | 34.0 |
| 8 | −15.529  |       |         |      |

$f_1 = 66.67$
$f_{123} = 86.71$
$f_4 = -708.14$

Embodiment 16
$f = 100 \quad W = 31.8° \quad F\ 3.5$

|   | R        | D     | N       | $\nu$ |
|---|----------|-------|---------|------|
| 1 | 25.092   | 12.35 | 1.58913 | 61.0 |
| 2 | 64.503   | 3.82  |         |      |
| 3 | −132.105 | 2.94  | 1.56700 | 34.0 |
| 4 | 29.376   | 2.94  |         |      |
| 5 | 56.598   | 5.29  | 1.49200 | 55.0 |
| 6 | −52.370  | 21.18 |         |      |
| 7 | −14.531  | 5.29  | 1.56700 | 34.0 |
| 8 | −16.855  |       |         |      |

Aspherical surface: fourth surface

K = −2.42739D−01
A1 = 5.90104D−06    P1 = 4.0000
A2 = 1.48313D−07    P2 = 5.0000
A3 = 3.48878D−09    P3 = 6.0000
A4 = −1.74313D−11   P4 = 8.0000
A5 = −2.31416D−14   P5 = 10.0000

Eighth surface

K = −3.96294D−02
A1 = 1.48153D−06    P1 = 4.0000
A2 = −7.92407D−08   P2 = 5.0000
A3 = −2.31692D−09   P3 = 6.0000
A4 = 2.42945D−11    P4 = 8.0000
A5 = −4.86672D−14   P5 = 10.0000

$f_1 = 62.45$
$f_{123} = 84.87$
$f_4 = -1058.24$
$\Delta X_8(0.14f) = 1.3216 \times 10^{-1}$

Embodiment 17
$f = 100 \quad W = 31.7° \quad F\ 3.5$

|   | R       | D    | N       | $\nu$ |
|---|---------|------|---------|------|
| 1 | 28.440  | 8.93 | 1.69680 | 55.5 |
| 2 | 65.259  | 3.53 |         |      |
| 3 | −88.843 | 2.35 | 1.56700 | 34.0 |
| 4 | 32.674  | 3.82 |         |      |
| 5 | 43.341  | 5.88 | 1.49200 | 55.0 |
| 6 | −51.088 | 21.63|         |      |
| 7 | −16.549 | 5.73 | 1.56700 | 34.0 |
| 8 | −20.607 |      |         |      |

Aspherical surface: fourth surface

K = 3.33543D−02
A1 = −3.14012D−07   P1 = 4.0000
A2 = −2.05342D−08   P2 = 5.0000
A3 = 4.07069D−09    P3 = 6.0000
A4 = −9.67727D−12   P4 = 7.0000
A5 = 2.64024D−12    P5 = 8.0000
A6 = −1.43852D−14   P6 = 9.0000
A7 = 1.09407D−15    P7 = 10.0000

Eighth surface

K = −4.37028D−01
A1 = −4.06839D−06   P1 = 4.0000
A2 = 6.51751D−08    P2 = 5.0000
A3 = −3.94972D−08   P3 = 6.0000
A4 = −2.19889D−11   P4 = 7.0000
A5 = 1.23884D−10    P5 = 8.0000
A6 = 1.95126D−14    P6 = 9.0000
A7 = −3.19975D−13   P7 = 10.0000

$f_1 = 65.79$
$f_{123} = 76.87$
$f_4 = -302.85$
$\Delta X_8(0.14f) = 4.2870 \times 10^{-2}$

Embodiment 18
$f = 100 \quad W = 31.7° \quad F\ 3.5$

|   | R        | D     | N       | $\nu$ |
|---|----------|-------|---------|------|
| 1 | 25.805   | 11.47 | 1.69680 | 55.5 |
| 2 | 48.261   | 4.12  |         |      |
| 3 | −172.048 | 2.35  | 1.56700 | 34.0 |
| 4 | 23.684   | 1.82  |         |      |
| 5 | 35.440   | 9.00  | 1.49200 | 55.0 |
| 6 | −57.970  | 22.35 |         |      |
| 7 | −16.393  | 5.88  | 1.56700 | 34.0 |
| 8 | −18.728  |       |         |      |

Aspherical surface: fourth surface

K = −5.75777D−02
A1 = 3.46649D−06    P1 = 4.0000
A2 = 8.27024D−08    P2 = 5.0000
A3 = 3.32381D−09    P3 = 6.0000
A4 = −7.44056D−11   P4 = 7.0000
A5 = −6.86361D−12   P5 = 8.0000
A6 = −3.34095D−13   P6 = 9.0000
A7 = −1.19016D−14   P7 = 10.0000

Eighth surface

K = −6.25895D−02
A1 = −2.04910D−06   P1 = 4.0000
A2 = 9.26479D−07    P2 = 5.0000
A3 = −8.54902D−08   P3 = 6.0000
A4 = 6.90637D−10    P4 = 7.0000
A5 = 1.25207D−10    P5 = 8.0000
A6 = 2.56578D−12    P6 = 9.0000
A7 = −2.77941D−13   P7 = 10.0000

$f_1 = 65.79$
$f_{123} = 87.12$
$f_4 = -2623.62$
$\Delta X_8(0.14f) = 1.0216 \times 10^{-1}$

Embodiment 19
$f = 100 \quad W = 32.0° \quad F\ 4.0$

|   | R        | D    | N       | $\nu$ |
|---|----------|------|---------|------|
| 1 | 27.015   | 9.47 | 1.69680 | 55.5 |
| 2 | 56.991   | 3.53 |         |      |
| 3 | −121.480 | 2.35 | 1.56700 | 34.0 |
| 4 | 27.786   | 3.59 |         |      |
| 5 | 37.352   | 7.35 | 1.49200 | 55.0 |
| 6 | −57.592  | 21.61|         |      |
| 7 | −16.695  | 5.44 | 1.56700 | 34.0 |
| 8 | −20.454  |      |         |      |

Aspherical surface: fourth surface

K = 8.45190D−02
A1 = 6.63372D−07    P1 = 4.0000
A2 = −3.74000D−08   P2 = 5.0000
A3 = 3.31001D−09    P3 = 6.0000
A4 = −5.77508D−11   P4 = 7.0000
A5 = 7.59380D−13    P5 = 8.0000
A6 = −6.16511D−14   P6 = 9.0000
A7 = −2.84727D−16   P7 = 10.0000

Eighth surface

K = −9.13850D−01
A1 = −1.25898D−05   P1 = 4.0000
A2 = 1.87805D−07    P2 = 5.0000
A3 = −4.59852D−08   P3 = 6.0000
A4 = −2.99232D−10   P4 = 7.0000
A5 = 1.20101D−10    P5 = 8.0000
A6 = 4.57320D−14    P6 = 9.0000
A7 = −3.19917D−13   P7 = 10.0000

Figure 1B:
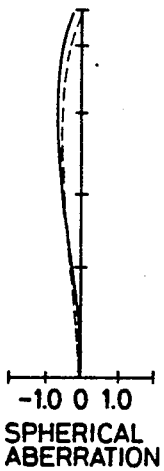
Figure 1B:
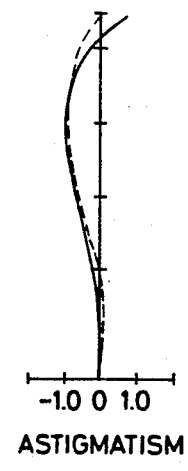
Figure 1B:
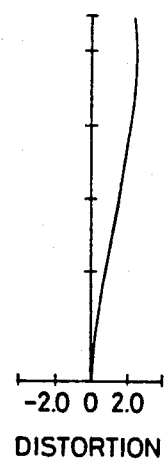
Figure 2A:
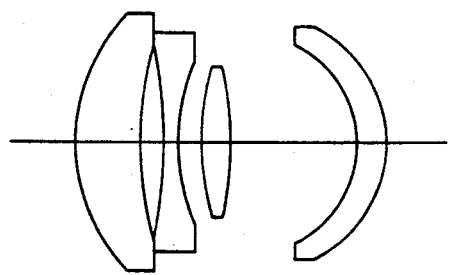
Figure 2B:
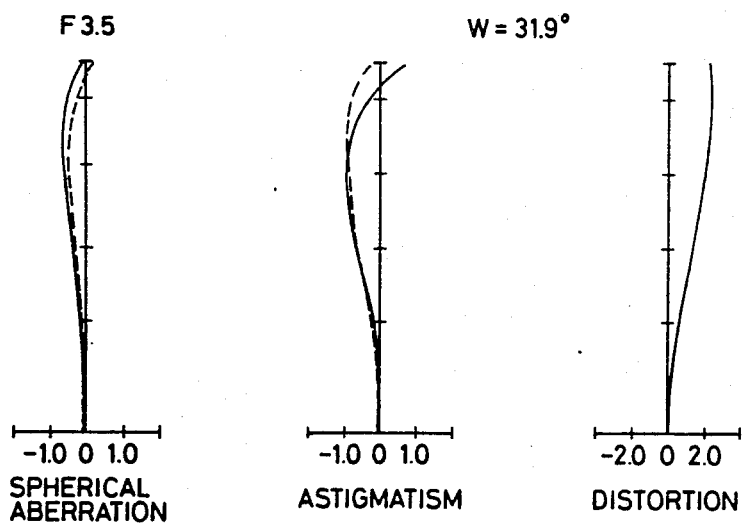
Figure 3A:
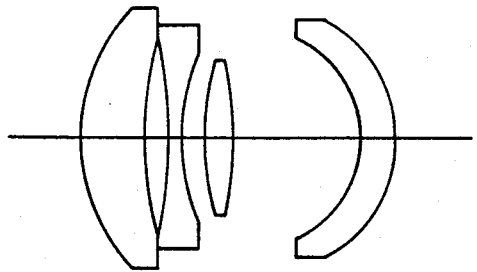
Figure 3B:
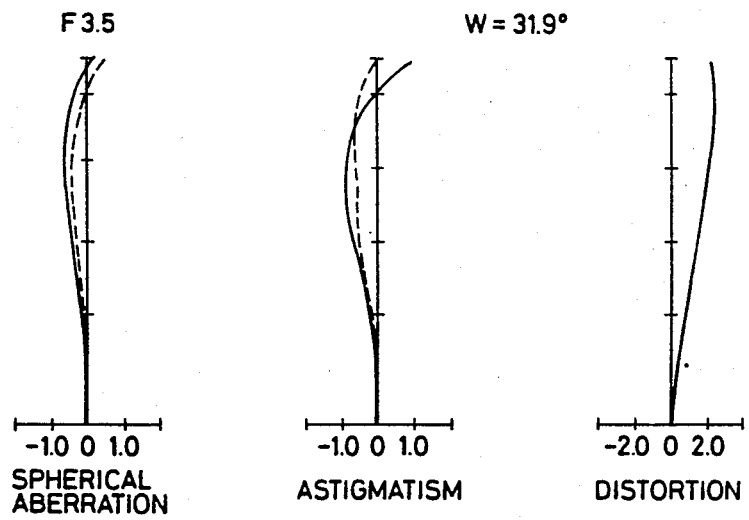
Figure 4A:
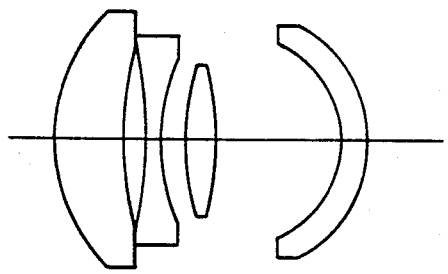
Figure 4B:
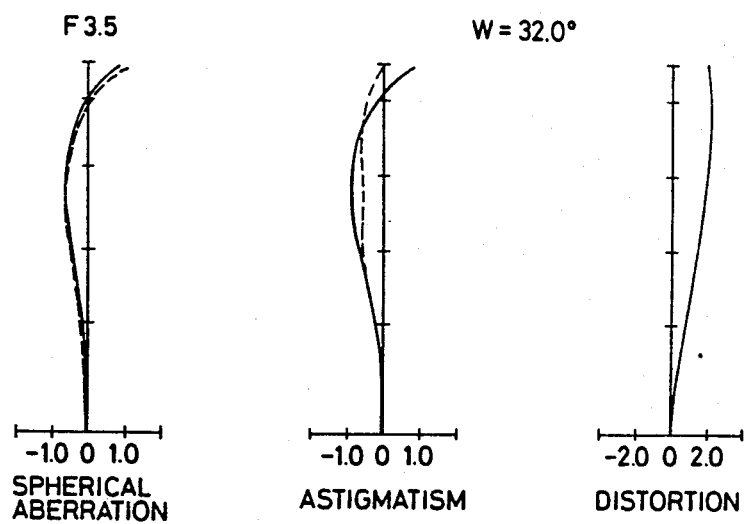
Figure 5A:
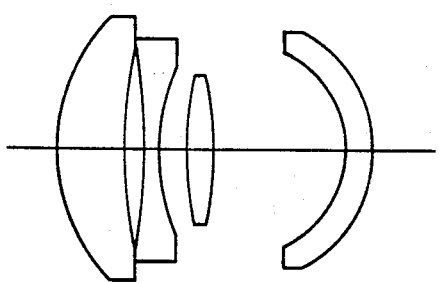
Figure 5B:
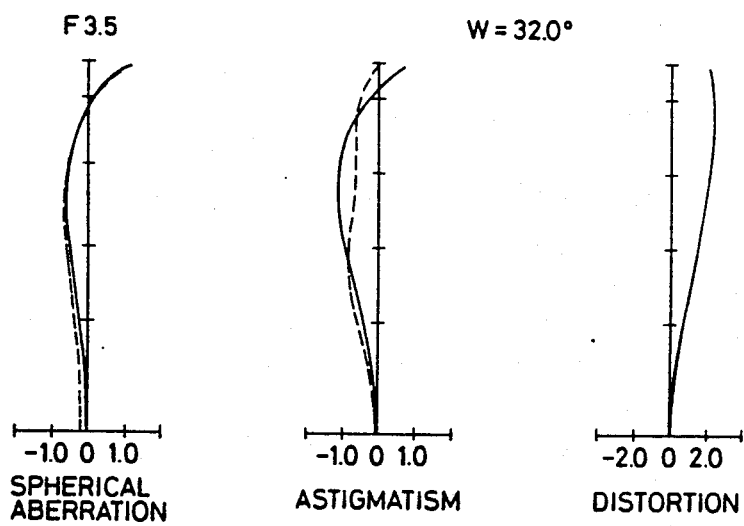
Figure 6A:
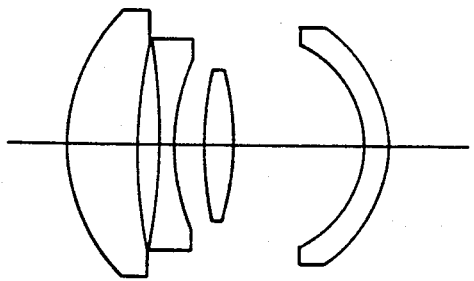
Figure 6B:
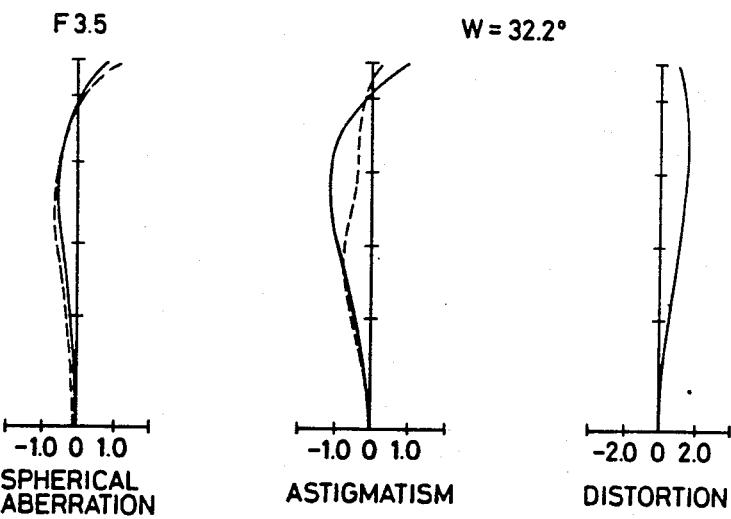
Figure 7A:
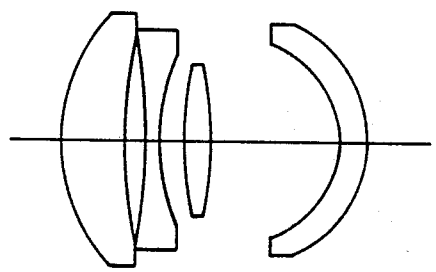
Figure 7B:
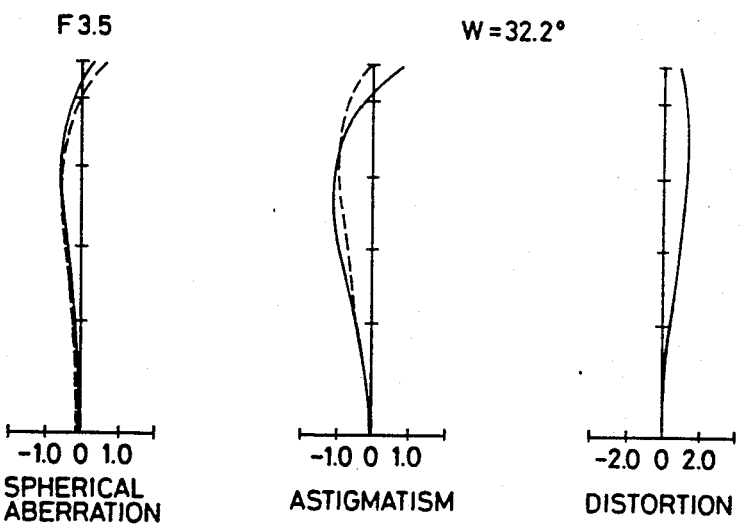
Figure 8A:
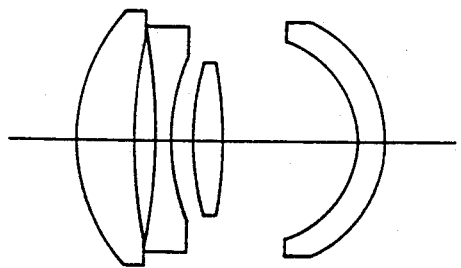
Figure 8B:
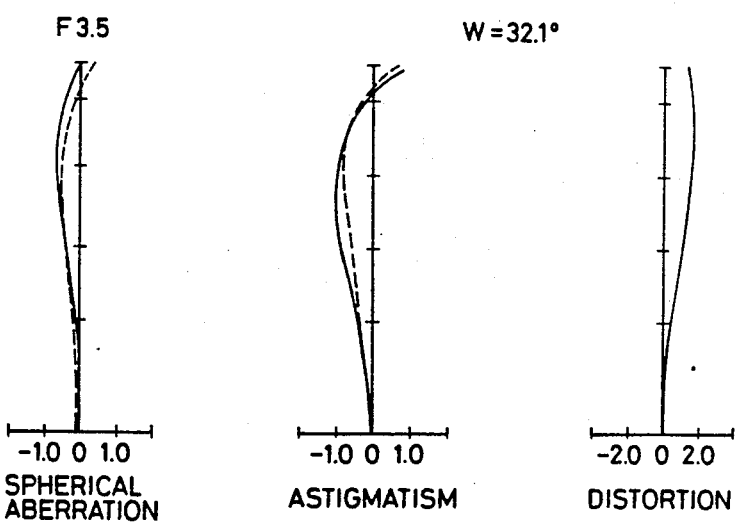
Figure 9A:
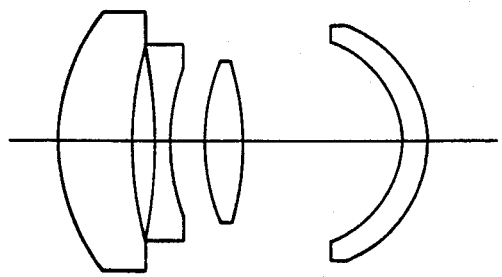
Figure 9B:
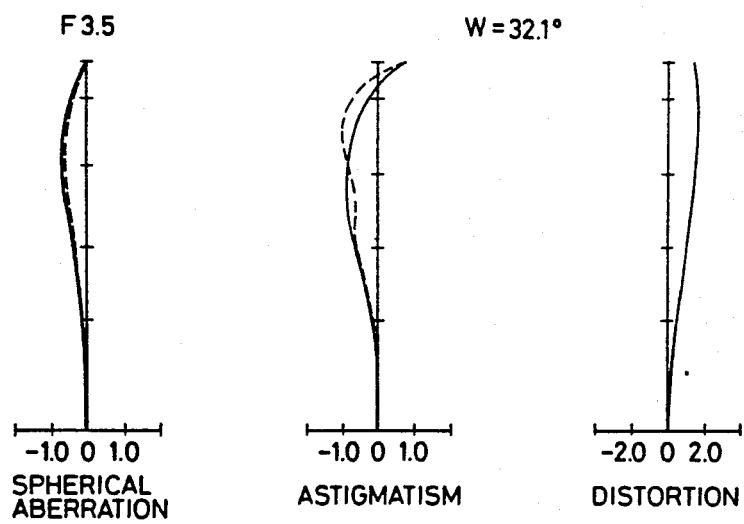
Figure 10A:
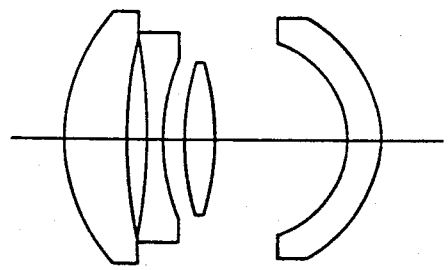
Figure 10B:
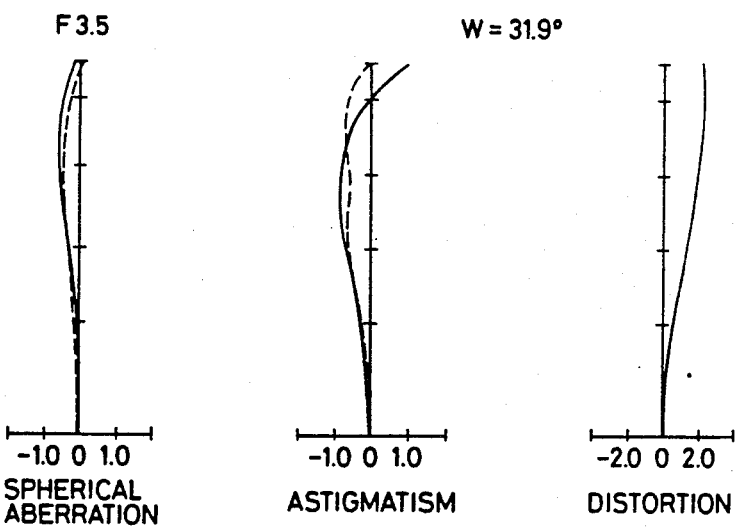
Figure 11A:
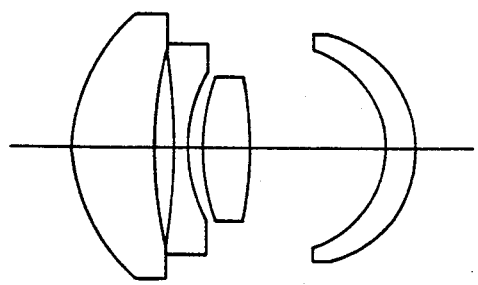
Figure 11B:
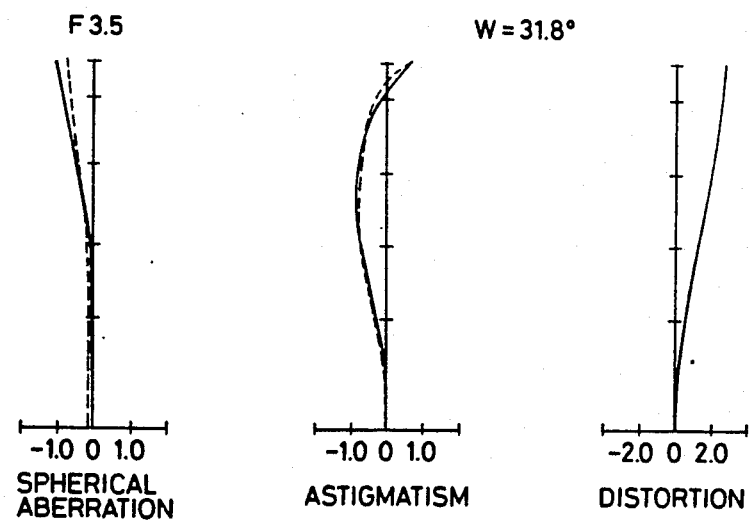
Figure 12A:
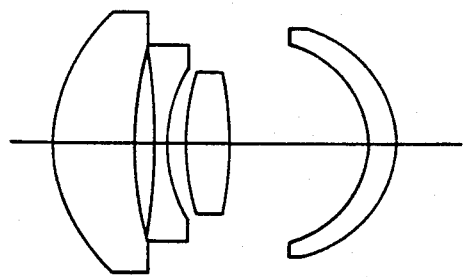
Figure 12B:
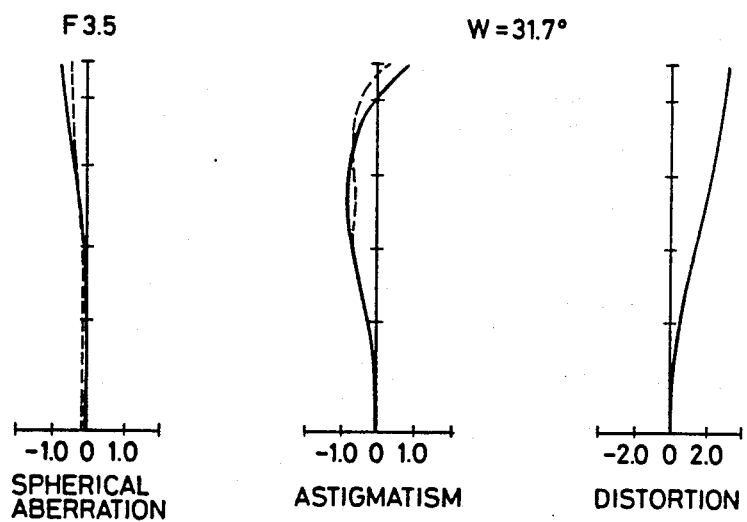
Figure 13A:
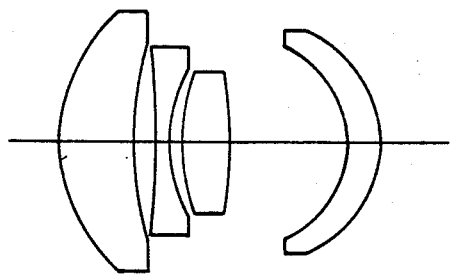
Figure 13B:
Figure 13B:
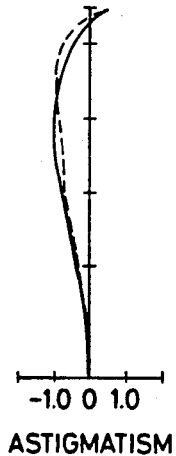
Figure 14A:
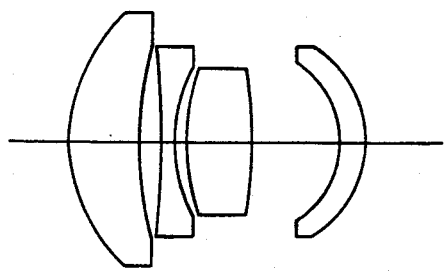
Figure 14B:
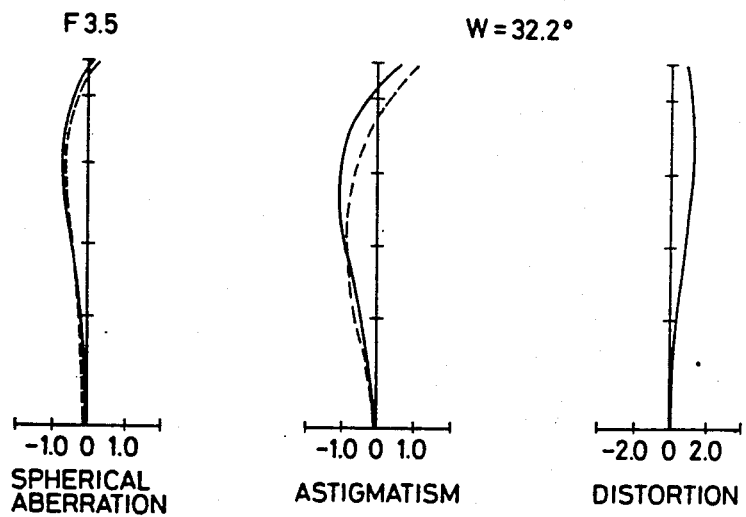
Figure 15A:
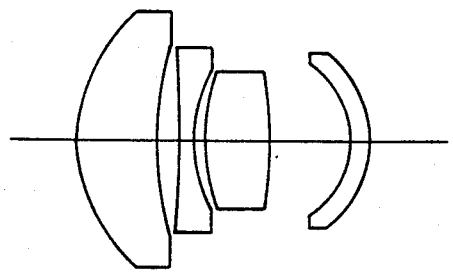
Figure 15B:
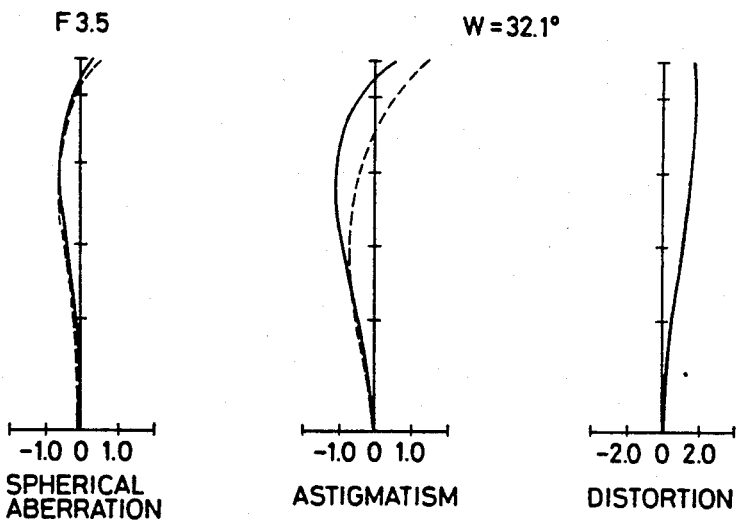
Figure 16A:
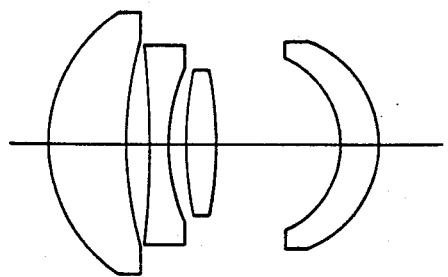
Figure 16B:
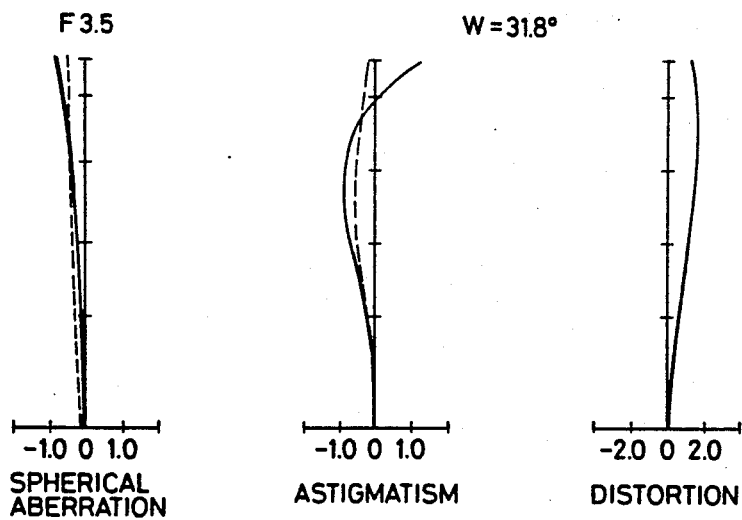
Figure 17A:
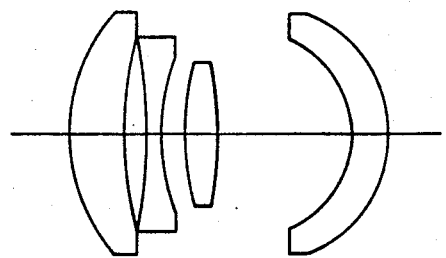
Figure 17B:
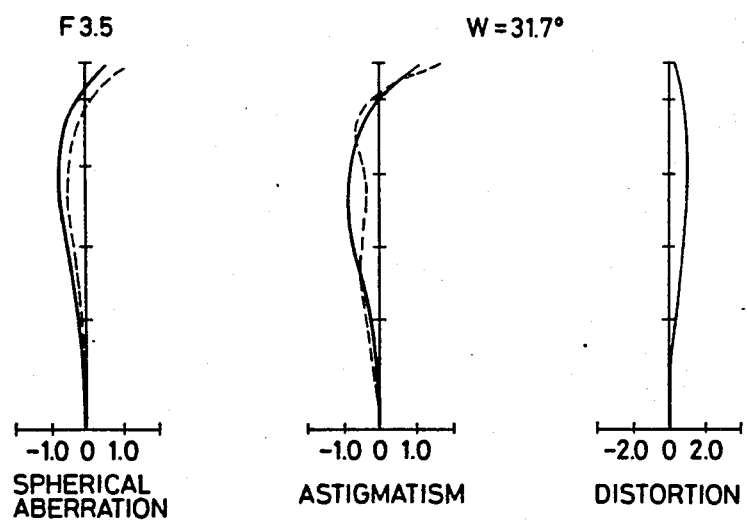
Figure 18A:
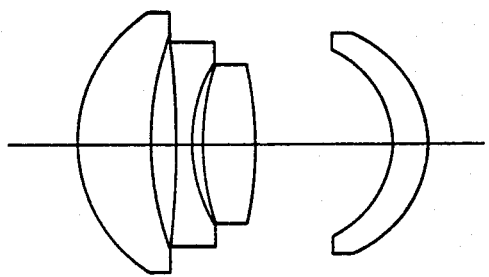
Figure 18B:
Figure 18B:
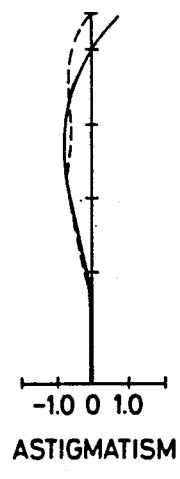
Figure 18B:
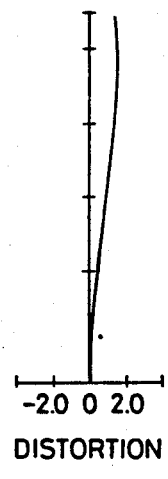
Figure 19A:
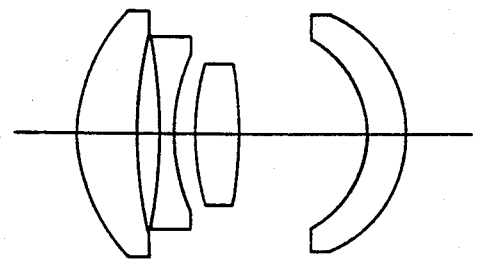
Figure 19B:
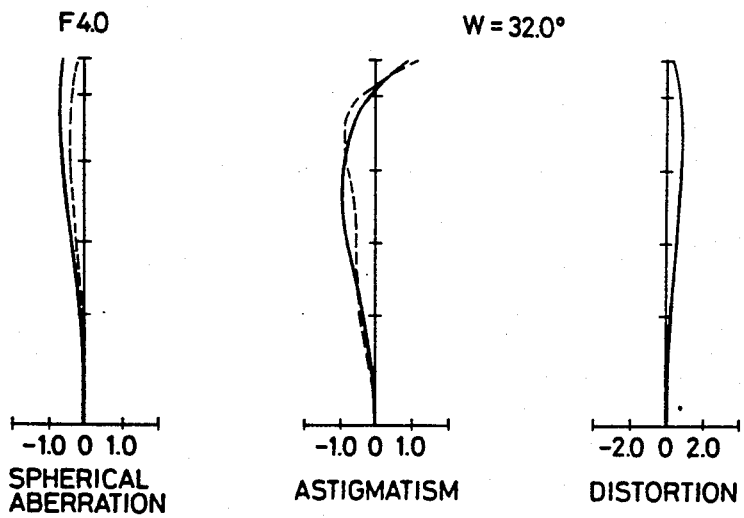

$f_1 = 65.25$
$f_{123} = 78.76$
$f_4 = 336.24$
$\Delta X_8(0.14f) = 2.6678 \times 10^{-4}$ The lens of this invention has the construction as described above. The second, third and fourth lenses comprise resin lenses to reduce cost, and even if the resin lenses are introduced, variation in backfocus resulting from variation in temperature less occurs to make better compensation of aberrations possible as can be seen in FIGS. 1 to 19 which show aberrations.

What is claimed is:

1. A wide angle lens comprising, from an object side, a first positive meniscus lens with a convex surface directed toward an object, a second dual concave lens, a third dual convex lens and a fourth negative meniscus lens with a concave surface greatly directed toward an object, said second, third and fourth lenses being made of resin, and the lens being satisfied with the following conditions:

$$1.1 < f/f_1 < 2.0$$

$$N_2 < 1.65$$

where f: combined focal length of the entire lens system, $f_1$: focal length of the first lens, and $N_2$: refractive index of the second lens.

2. A wide angle lens of claim 1, wherein the lens is satisfied with $$0.50 < f_{123}/f < 1.0$$

where $f_{123}$: combined focal length from the first lens to the third lens.

3. A wide angle lens of claim 1, wherein the lens is satisfied with $$0.02f < d_5 < 0.25f$$

where $d_5$: thickness of the third lens.

4. A wide angle lens of claim 1, wherein the lens is satisfied with $$N_3 < 1.65$$

$$N_4 < 1.65$$

where $N_3$: refractive index of the third lens, and $N_4$: refractive index of the fourth lens.

5. A wide angle lens of claim 4, wherein the lens is satisfied with $$0 < f/|f_4| < 1.0, f_4 < 0$$

where $f_4$: focal length of the fourth lens.

6. A wide angle lens comprising, from an object side, a first positive meniscus lens with a convex surface directed toward an object, a second dual concave lens, a third dual convex lens and a fourth negative meniscus lens with a concave surface greatly directed toward an object, said second, third and fourth lenses being made of resin, said lens being satisfied with the following conditions:

$$1.1 < f/f_1 < 2.0$$

$$N_2 < 1.65$$

where f: combined focal length of the entire lens system, $f_1$: focal length of the first lens, and $N_2$: refractive index of the second lens, wherein the lens is satisfied with the following conditions $$-1.0 \times 10^{-2} < \Delta_7(0.13f)/f < 1.0 \times 10^{-5}$$

$$1.0 \times 10^{-5} < \Delta_8(0.14f)/f < 5.0 \times 10^{-2}$$

where $\Delta_i(0)$ represents the amount of an aspherical surface of the $i^{th}$ refractive surface, and if the aspherical shape is represented by $$Z(\phi) = \frac{C\phi^2}{1 + \sqrt{1 - (1 + k)C^2\phi^2}} + \sum_j A_p \phi^P;$$

an amount of displacement from a spherical surface having a paraxial curvature at a position of $\phi$ from an optical axis is given by:

$$\Delta(\phi) = \frac{C\phi^2}{1 + \sqrt{1 - (1 + k)C^2\phi^2}} \Sigma +$$

$$A_p \phi^P; - \frac{C^* \phi^2}{1 + \sqrt{1 - C^{*2}\phi^2}}$$

$$C^* = C + 2A_2$$

* * * * *